United States Patent
Natarajan et al.

(10) Patent No.: US 7,480,781 B2
(45) Date of Patent: Jan. 20, 2009

(54) APPARATUS AND METHOD TO MERGE AND ALIGN DATA FROM DISTRIBUTED MEMORY CONTROLLERS

(75) Inventors: Rohit Natarajan, Sunnyvale, CA (US); Sridhar Lakshmanamurthy, Sunnyvale, CA (US); Chen-Chi Kuo, Pleasanton, CA (US)

(73) Assignee: Intel Corporation, Santa Clara, CA (US)

( * ) Notice: Subject to any disclaimer, the term of this patent is extended or adjusted under 35 U.S.C. 154(b) by 328 days.

(21) Appl. No.: 11/026,653

(22) Filed: Dec. 30, 2004

(65) Prior Publication Data

US 2006/0149872 A1    Jul. 6, 2006

(51) Int. Cl.
*G06F 7/14* (2006.01)
(52) U.S. Cl. .............................. 711/170; 711/5; 711/201
(58) Field of Classification Search .................. 711/154, 711/157, 173
See application file for complete search history.

(56) References Cited

U.S. PATENT DOCUMENTS

| 6,741,256 B2 * | 5/2004 | Emberling ................... 345/540 |
| 7,089,379 B1 * | 8/2006 | Sharma et al. ............... 711/154 |
| 2005/0246508 A1 * | 11/2005 | Shaw ........................... 711/157 |
| 2006/0168408 A1 * | 7/2006 | Nowshadi ..................... 711/157 |

* cited by examiner

*Primary Examiner*—B. James Peikari
(74) *Attorney, Agent, or Firm*—Caven & Aghevli LLC

(57) ABSTRACT

We describe a system and method to merge and align data from distributed memory controllers. A memory system includes a command bus to transmit a predetermined memory access command, and a memory interface to manipulate data from at least two memory channels, each memory channel corresponding to a portion of a distributed memory, responsive to the predetermined memory access command. The memory interface includes a plurality of memory controllers coupled to the command bus, each memory controller being operable to control a corresponding memory channel responsive to the predetermined memory access command, and a push arbiter coupled to each memory controller. The push arbiter being is operable to merge and align data retrieved responsive to each split read align command.

6 Claims, 8 Drawing Sheets

APPARATUS AND METHOD TO MERGE AND ALIGN DATA FROM DISTRIBUTED MEMORY CONTROLLERS

FIELD OF THE INVENTION

This invention relates to accessing a distributed memory and, more specifically, to merging and aligning data retrieved by distributed memory controllers.

BACKGROUND OF THE INVENTION

Microprocessors, digital signal processors, digital imaging devices, and many other types of digital data processing devices rely on a memory system to store data and/or instructions needed by the processing device. FIG. 1 depicts a typical memory system configuration 100. Memory system 100 comprises a memory 140 to store digital data and memory controller 110 to control access to memory 140. An address/command bus and a data bus transmit memory signals, e.g., on set of signal lines, between memory controller 110 and memory 140. Memory signals fall generally into one of several categories including data signals, address signals, command signals, and the like. Data signals carry the actual data that will be stored in, or retrieved from, memory 140, and pass across data bus. Address signals specify the location within memory 140 where data is to be read from or written to. Command signals instruct memory 140 as to what type of operation is to be performed, e.g., read or write.

A processing device 50 issues data store and retrieve requests to memory controller 110. The processing device 50 may be a processor or any device capable of processing or manipulating electronic signals. The memory controller 110 acts as an intermediary for the exchange of data between processing device 50 and memory 140. For instance, when the processing device 50 issues a retrieve request, the memory controller 110 retrieves data from memory 140 and provides the retrieved data to processing device 50. The memory controller 110 retrieves data from memory 140 over the data bus by providing appropriate address and control signals to the memory 140 over the address/command bus.

As processing devices become faster and more powerful, the increased demands placed on them generally translate to a need for larger and faster memory systems. FIG. 2 shows one memory system implementation 200 that addresses the increased demands. A distributed memory 220 contains multiple memories 140, 150, and 160, each to store digital data within a predetermined address space. Each address space may be a predetermined address range or multiple interleaved ranges within a monolithic memory space. Or each address space may address space separately located in physically distinct memories. For ease of programmability and to maintain backward capability of memory system 200, processing device 50 typically perceives distributed memory 220 as one monolithic memory space regardless of the actual configuration.

Memory interface 210 comprises memory controllers 110, 120, and 130 that control access to memories 140, 150, and 160, respectively, where each memory access path is known as a memory channel. When processing device 50 stores or retrieves data from address space corresponding to memory 140, processing device 50 issues a data store or a retrieve request to memory controller 110, where memory controller 110 acts as an intermediary for the exchange of data between processing device 50 and memory 140. Memory controllers 120 and 130 perform similarly to memory controller 110 with respect to data exchanges between processing device 50 and memories 150 and 160, respectively, when device 50 issues a data store or a retrieve request. By increasing the number of memory channels and by distributing memory 220, memory system 200 allows processing device 50 to perform multiple independent memory accesses to memories 140, 150, and 160, thus increasing the throughput (speed) and size of the memory system 200.

Memory system 200, however, can have disadvantages. Among these disadvantages is when processing device 50 requests data retrieval and shift spanning multiple channels, where independent shifting of data retrieved from each channel causes erroneous data to be provided to the processing device 50. This problem may commonly occur when storing and retrieving large blocks of contiguous data, particularly networking applications such as packet header processing.

FIG. 3 shows an illustration of this problem. Distributed memory 220 contains data B0-BF stored between two memory channels, data B0-B7 within memory 140 and data B8-BF within memory 150. Data retrieval spanning multiple channels is typically performed by processing device 50 issuing a first request to memory controller 110 to retrieve data B0-B7 and a second request to memory controller 120 to retrieve data B8-BF. Upon receipt of the requests, memory controllers 110 and 120 independently retrieve the corresponding data and provide it to processing device 50 in the form shown in diagram 310.

Diagram 320 shows the form data B0-BF should be provided to processing device 50 when performing data retrieval with a corresponding shift by 2, where each X denotes a filler byte of data. X bytes can typically be skipped by processing device 50 when they are inserted at the beginning or end of the retrieved data, however, when added elsewhere detrimental results may occur during processing of the retrieved data. When data retrieval spanning multiple channels with a corresponding shift by 2 is performed in memory system 200, data B0-BF is provided in the form shown in diagram 330, where X bytes are inserted in the middle of the retrieved data. Accordingly, a need remains for a method and apparatus to merge and align data retrieved by distributed memory controllers prior to providing the data to a processing device.

BRIEF DESCRIPTION OF THE DRAWINGS

The invention may be best understood by reading the disclosure with reference to the following drawings.

DETAILED DESCRIPTION OF THE INVENTION

This is a multi-channel distributed memory system implementation. We recognized that memory systems employing distributed memory have difficulty retrieving and shifting data spanning multiple memory channels, as the shift functionality requires a merging of data retrieved through two independent memory channels. By improving each memory controller and adding a push arbiter to a memory interface, merging and aligning data retrieved through multiple channels is achieved with minimal communication between the memory controllers.

Figure 1:
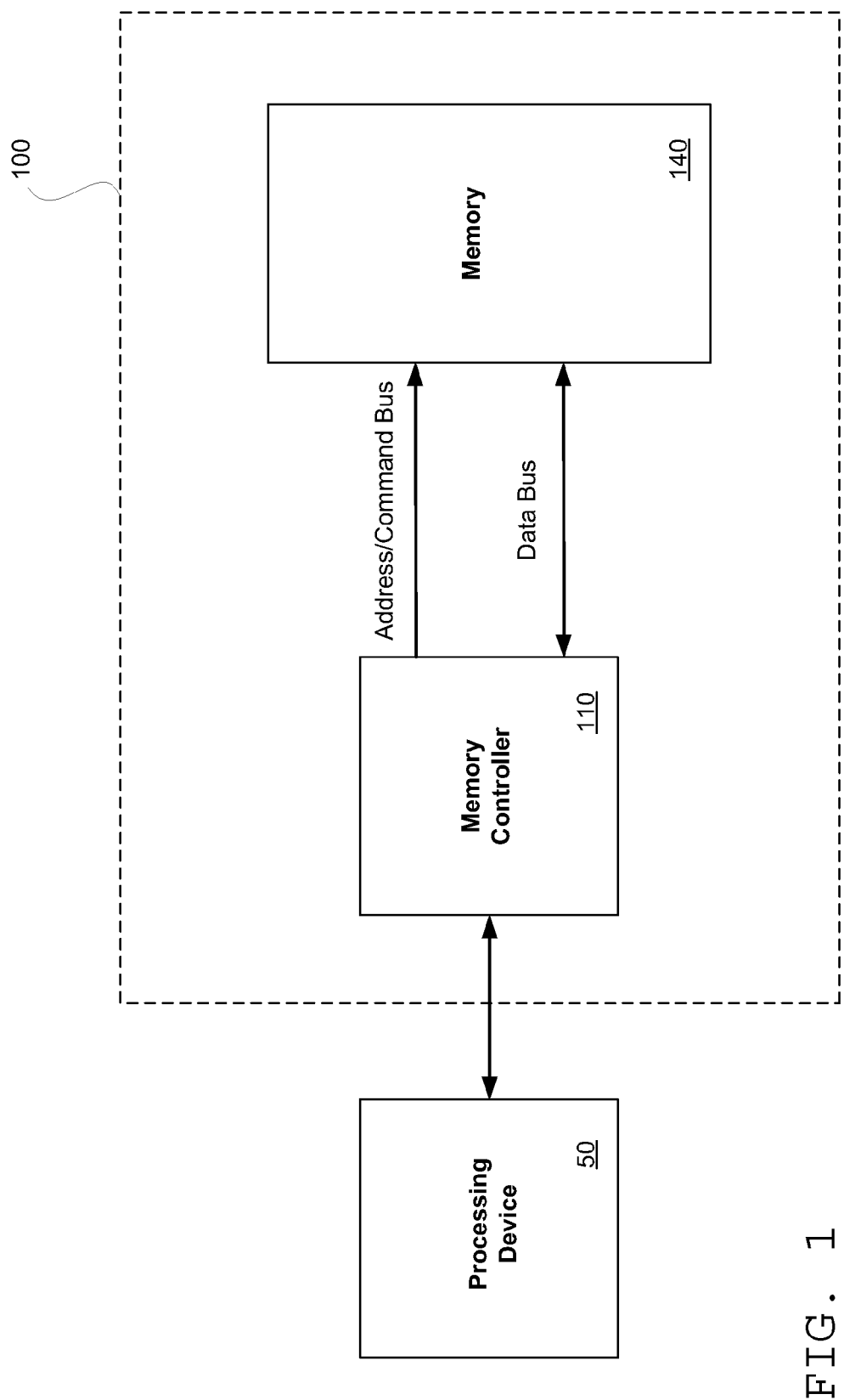
FIGS. 1 and 2 illustrate memory systems.
Figure 2:
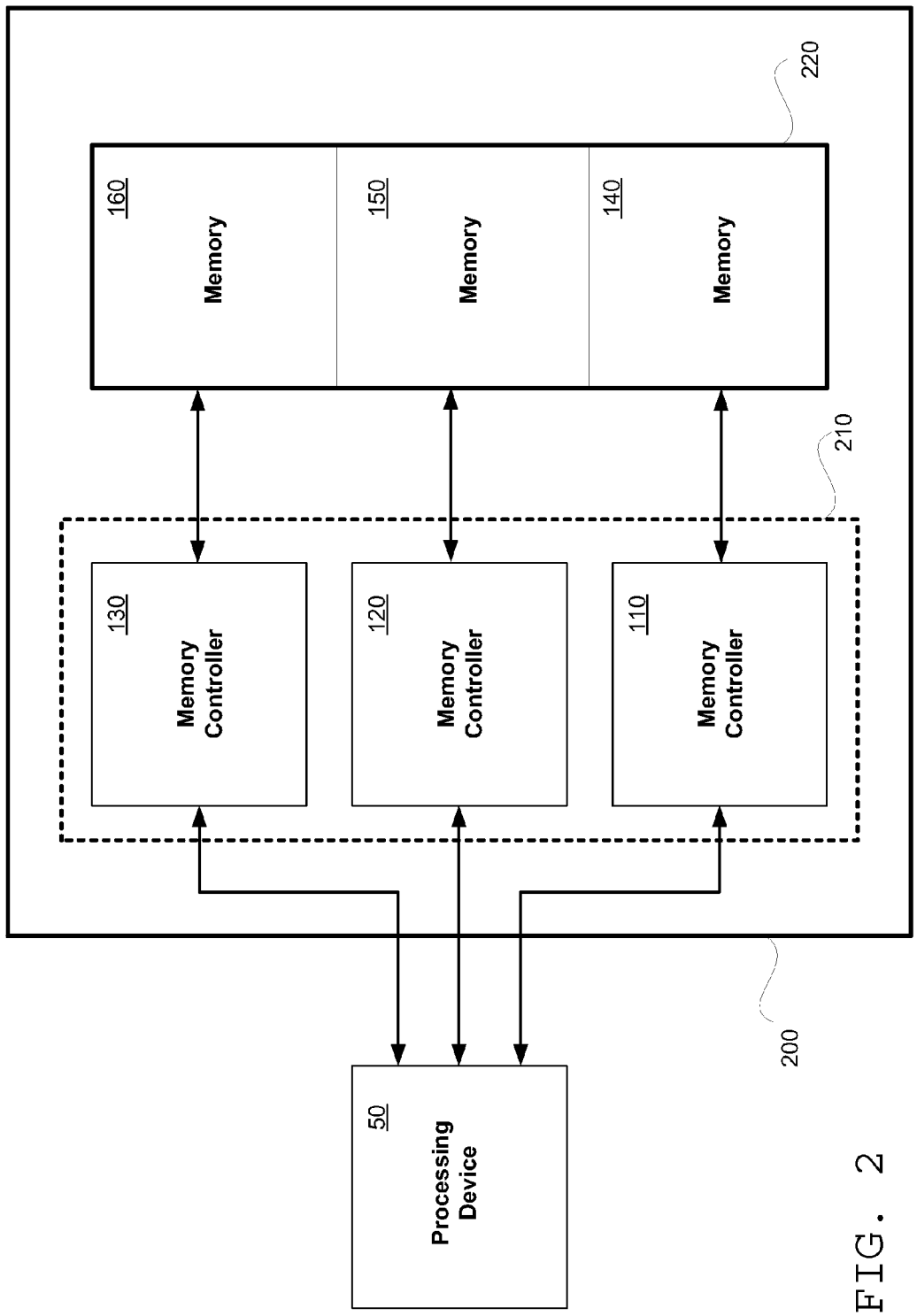
Figure 3:
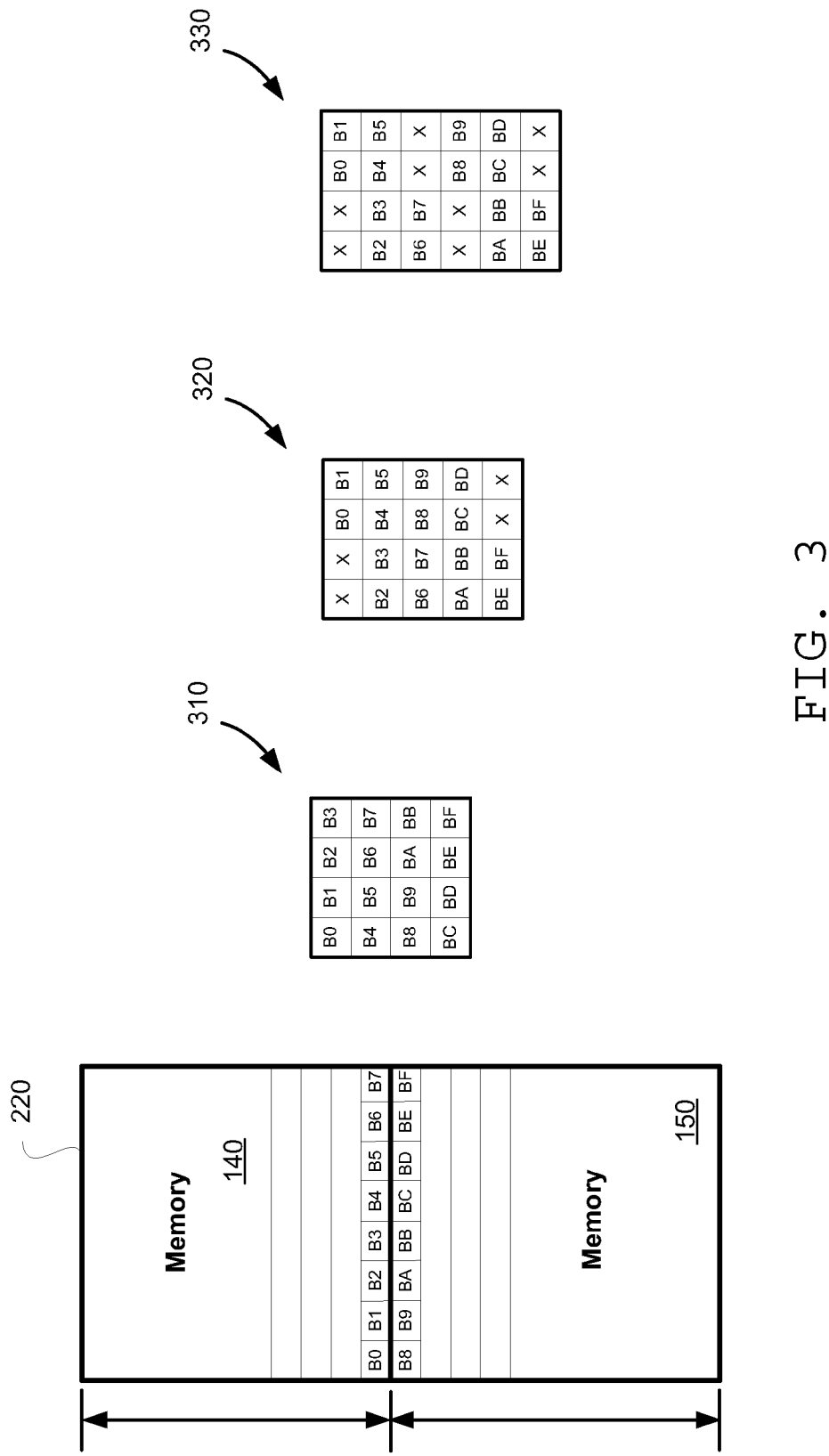
FIG. 3 is a graph of multi-channel data retrieval using the memory system of FIG. 2.
Figure 4:
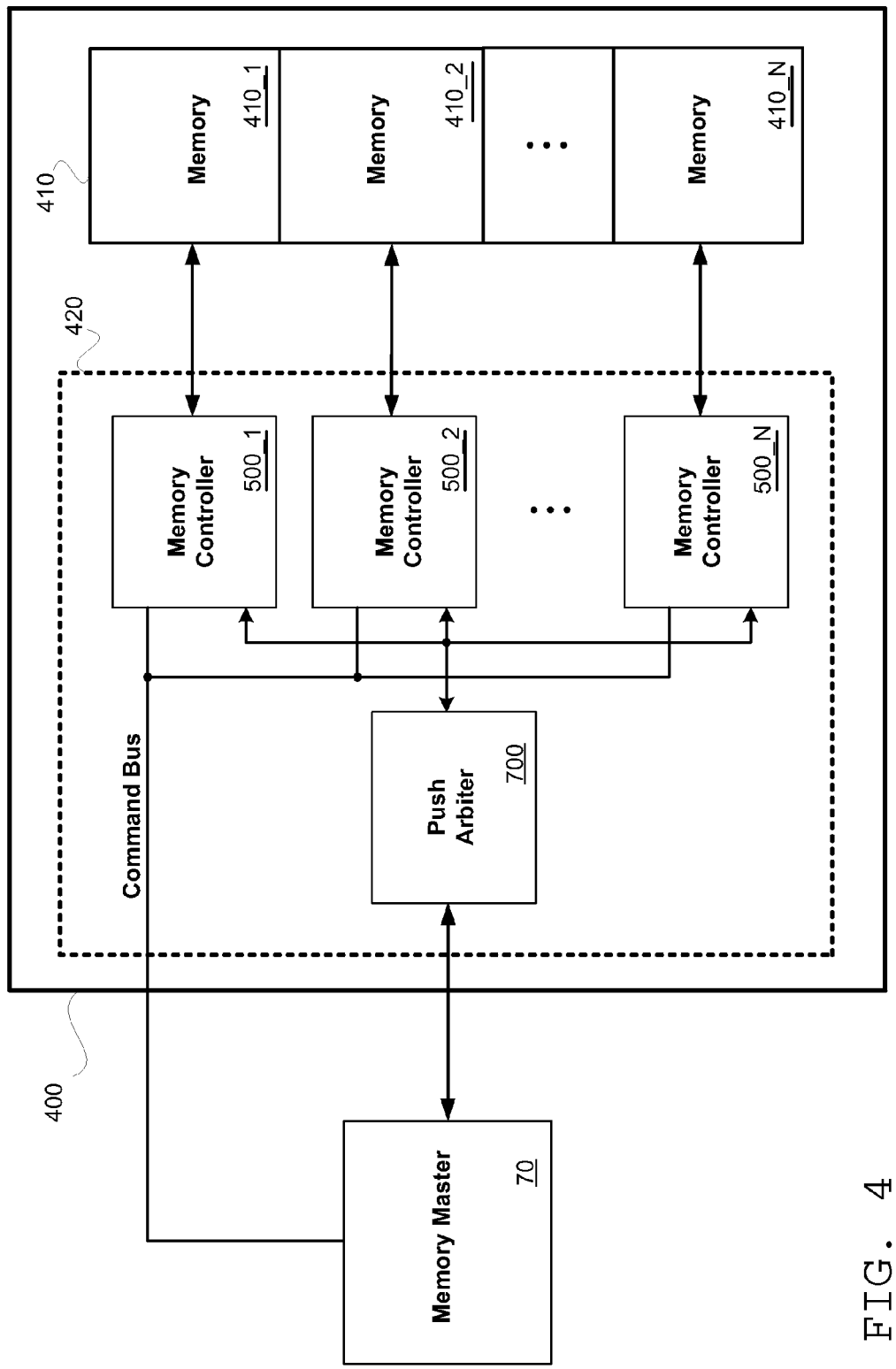
FIG. 4 is a block diagram of a multi-channel distributed memory system according to an embodiment of the invention.

FIG. 4 is a block diagram of a multi-channel distributed memory system 400 according to an embodiment of the invention. Distributed memory 410 contains a plurality of memories 410_1 to 410_N, each to store digital data within a predetermined address space. Each address space may be a predetermined address range of a memory or located in physically distinct memories. Each address space of the memories 410_1 to 410_N may be interleaved 128 Byte blocks within a monolithic memory.

Memory master 70 may access distributed memory 410 via memory interface 420. Memory master 70 may be a processing device, a Peripheral Component Interconnect (PCI) device, or any other device capable of processing or manipulating electrical signals. For ease of programmability and to maintain backward capability of multi-channel distributed memory system 400, memory master 70 typically perceives distributed memory 410 as one monolithic memory space, regardless of the actual configuration. Although only one memory master 70 is shown coupled to memory system 400, in other embodiments, memory system 400 may support multiple memory masters 70.

An embodiment of memory interface 420 will be explained with reference to FIGS. 4-8. Referring to FIG. 4, memory interface 420 comprises a plurality of memory controllers 500_1 to 500_N and a push arbiter 700. Push arbiter 700 is coupled between memory master 70 and memory controllers 500_1 to 500_N, where each memory controller 500_1 to 500_N controls access to memories 410_1 to 410_N, respectively. Upon reception of a memory access command from memory master 70 over a shared command bus, each memory controller 500_1 to 500_N determines the type of the command, e.g., Read, Write, Read_Align, or the like, and the portion of distributed memory 410 to be accessed. A Read_Align command requests memory interface 420 retrieve data from distributed memory 410 and shift the retrieved data prior to providing the data to memory master 70. When a Read_Align command is issued to memory controllers 500_1 to 500_N for data retrieval from memory 410_1, each memory controller 500_1 to 500_N determines data is to be retrieved by memory controller 500_1. Upon retrieval of the data by memory controller 500_1, the retrieved data is shifted by push arbiter 700 and provided to memory master 70 responsive to its initial memory access command.

Since memory master 70 regards distributive memory 410 as a monolithic memory, each memory access command may be "split" between two or more memory channels. When a split Read_Align command is issued for data retrieval from memory 410_1 and 410_2, memory controllers 500_1 and 500_2 each independently retrieve and "tag" the data from memories 410_1 and 410_2, respectively, and provide the tagged data to push arbiter 700. Push arbiter 700 subsequently manipulates and provides the tagged data to memory master 70, where manipulation may constitute merging, aligning, shifting, combining, altering, modifying, or the like, or any combination thereof.

Figure 5:
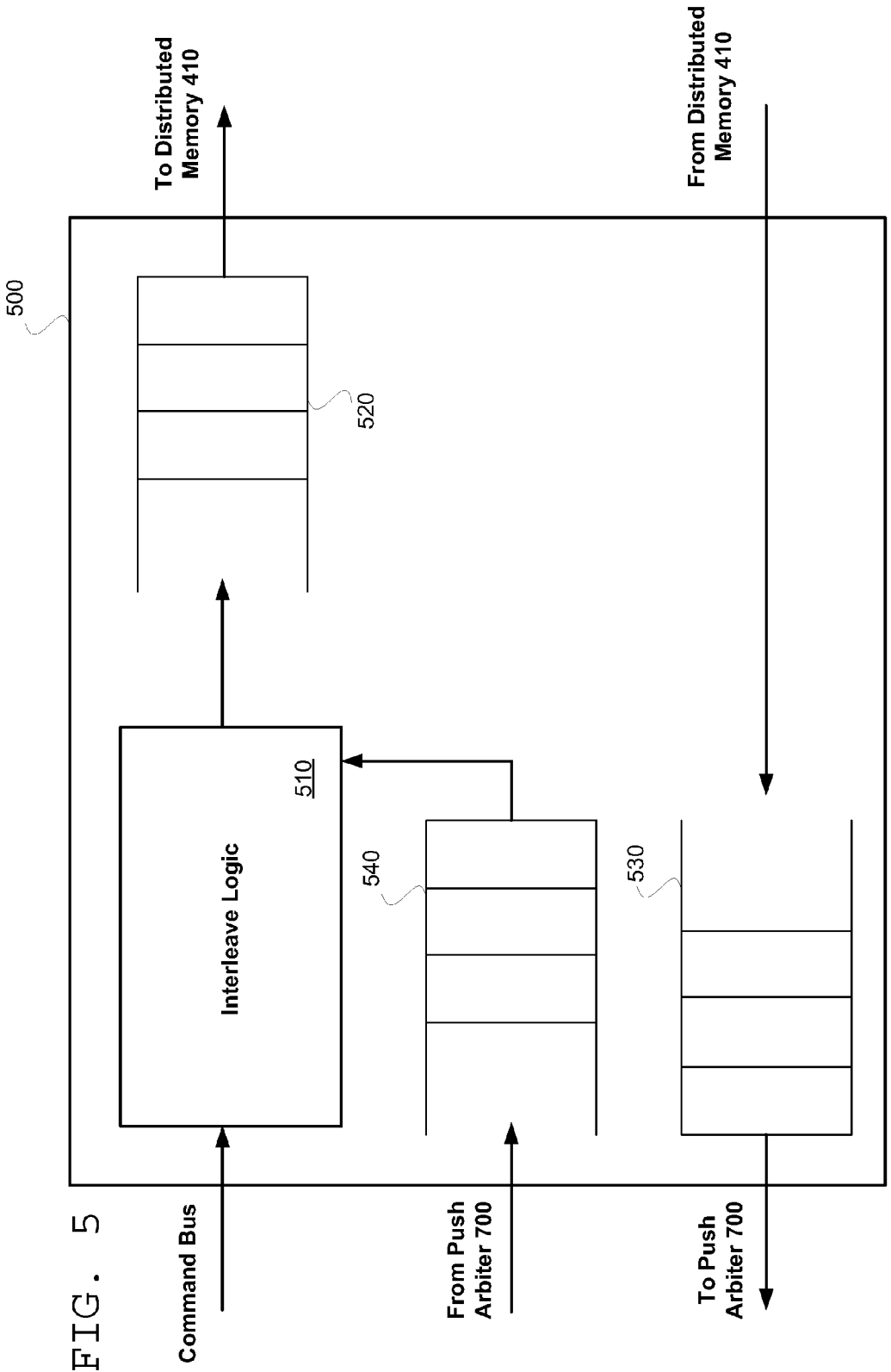
FIG. 5 is a block diagram of memory controller within the multi-channel distributed memory system of FIG. 4.

FIG. 5 is a block diagram of memory controller 500_1 within the multi-channel distributed memory system 400. Referring to FIG. 5, an interleave logic 510 receives memory access commands from memory master 70 over the command bus. Interleave logic 510 may determine whether a command requests access to a portion of distributed memory 410 corresponding to memory controller 500_1. In an embodiment, interleave logic 510 comprises an address decoder 511 to decode the address portion of the memory access command. When N memory controllers are present in memory interface 420, where N is a positive integer greater than 1, the address decoder 511 may perform a modulo-N reduction on the address portion of the memory access command to determine, for example, whether the command addresses the distributed memory 410 corresponding to memory controller 500. The address decoder 511 may decode the address in a variety of manners to determine any number of conditions.

An inlet command queue 520 provides memory access commands to distributed memory 410, where queue 520 receives each command upon the determination that the command requests access to a portion of distributed memory 410 corresponding to memory controller 500_1. When provided with a retrieval command by inlet command queue 520, e.g., Read or Read_Align, memory 410 provides data corresponding to the retrieval command to a push queue 530, where push queue 530 provides the retrieved data to push arbiter 700.

Memory controller 500_1 maintains a scoreboard free-list 540 populated with scoreboard entries, each entry to facilitate push arbiter 700 merging and aligning data retrieved with a split Read_Access command. The merging and aligning of the retrieved data requires a shift in the retrieved data, e.g., a shift of 1-3 bytes. In an embodiment, the scoreboard free-list 540 is a queue to hold unallocated scoreboard entries. Each memory controller 500_1 to 500_N may maintain a scoreboard free-list 540, where each free-list 540 is updated upon receipt of each split Read Access command over shared command bus.

Figure 6:
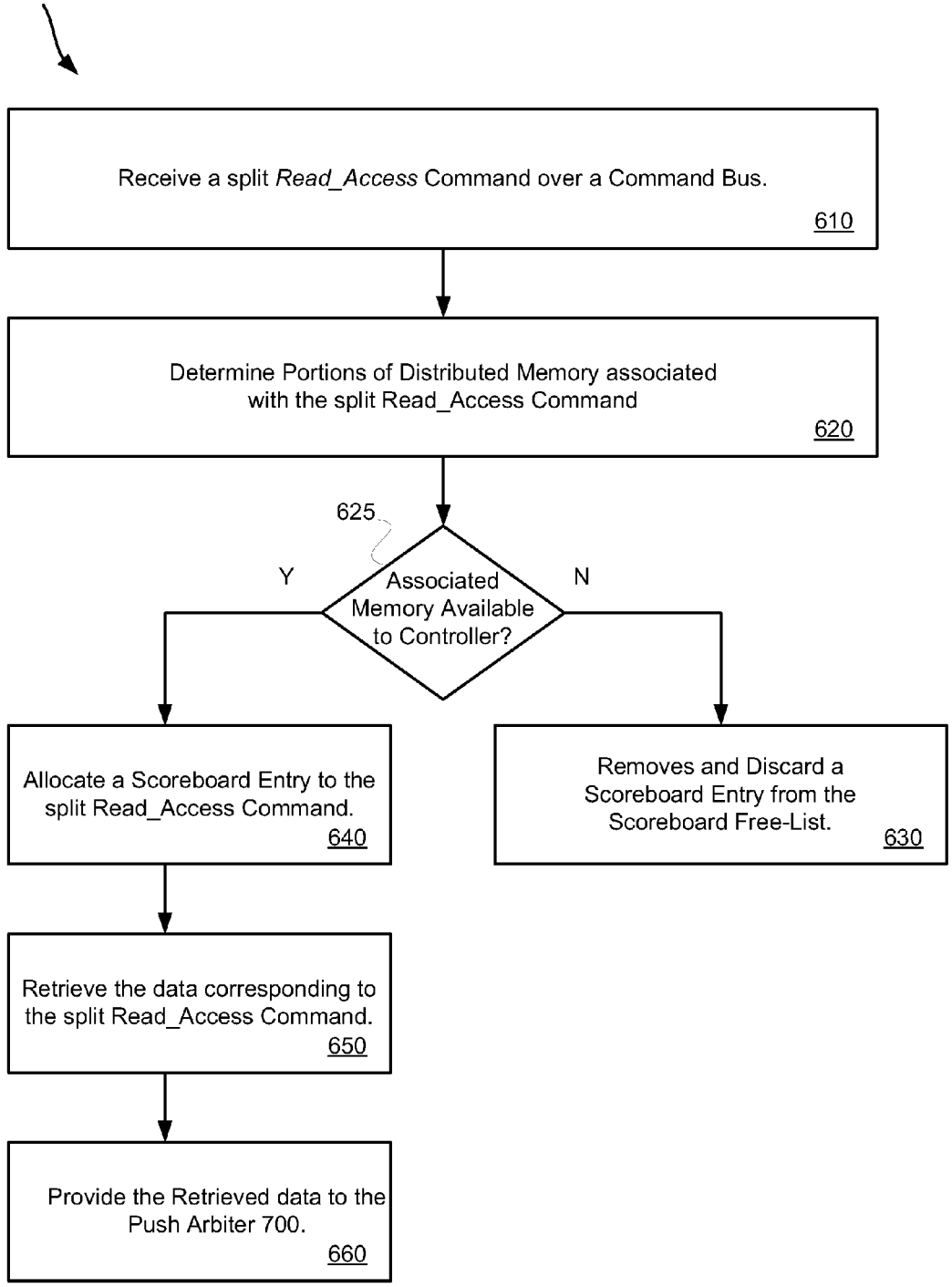
FIG. 6 is an example flow chart for operation of each memory controller of FIG. 4.

FIG. 6 is an example flow chart 600 for operation of the memory controller 500_1 upon reception of a split Read_Align command over a shared command bus. According to a block 610, a memory controller 500_1 receives a split Read_Align memory access command. Although interleave logic 510 is shown receiving memory commands directly from the command bus, in other embodiments an intermediate receiver may receive the memory access commands and provide each to interleave logic 510.

According to a next block 620, memory controller 500_1 determines the portions of distributed memory 410 associated with the split Read_Align command. In an embodiment, address decoder 511 within interleave logic 510 decodes the address portion of the split Read_Align command to determine the portions of distributed memory 410 to access responsive to the split Read_Align command. When N memory controllers are present in memory interface 420, where N is a positive integer greater than 1, the address decoder 511 may perform a modulo-N reduction on the address portion of the memory access command to determine whether the command addresses the distributed memory 410 corresponding to memory controller 500_1. As before, the address decoder 511 may decode the address in a variety of manners to determine any number of conditions.

A next decision block 625 determines whether one of the associated portions of distributed memory 410 corresponding to the memory controller 500_1. When it is determined the memory access command does not request access to a portion of distributed memory 410 corresponding to the memory controller 500_1, according to a next block 630, memory controller 500_1 removes and discards a scoreboard entry from the scoreboard free-list 540. By removing and discarding the scoreboard entry, memory controller 500_1 updates scoreboard free-list 540 to coincide with the allocation of the scoreboard entry by another memory controller. In an embodiment, the scoreboard entry is the entry at the head of a free-list queue.

When, at decision block 625, it is determined the memory access command requests access to a portion of distributed memory 410 corresponding to the memory controller, according to a next block 640, memory controller 500_1 allocates a scoreboard entry from the scoreboard free-list 530 to the split Read_Align command. In an embodiment, interleave logic 510 removes the scoreboard entry from the free-list 530 and adds it to the split Read_Align command as it is being provided to inlet command queue 520. Alternatively, interleave logic 510 may add the scoreboard entry to data retrieved in accordance with the split Read_Align command. The scoreboard entry may be the entry at the head of a queue.

According to a next block 650, memory controller 500_1 retrieves data from the corresponding portion of distributed memory 410 according to the split Read_Align command. Interleave logic 510 provides the split Read_Align command to inlet command queue 520, where the command is provided to the corresponding portion of distributed memory 410. Data retrieved in accordance with the split Read_Align command is received at push queue 530, and in an embodiment, contains information regarding the number of bytes push arbiter 700 is to shift the data. In another embodiment, the scoreboard entry indicates the number of bytes push arbiter 700 is to shift the data.

According to a next block 660, memory controller 500_1 provides the retrieved data allocated with the scoreboard entry to the push arbiter 700. In an embodiment, the push queue 530 provides the data when it reaches the head of the queue.

Referring to FIGS. 4 and 5, since each memory controller 500_1 to 500_N receives the same memory access commands, each corresponding scoreboard free-list 540 is updated with each split Read_Align command from memory master 70, and deallocation signal from push arbiter 700. This independent updating of corresponding scoreboard free-lists 540 allows memory controllers 500_1 to 500_N to provide scoreboard entries to push arbiter 700 with minimal communication with each other. Furthermore, the ability of each memory controller 500_1 to 500_N to receive the same command and determine which command applies to each portion of distributed memory 410, eases the burden on memory master 70 and improves the backward capability of memory system 400.

Figure 7:
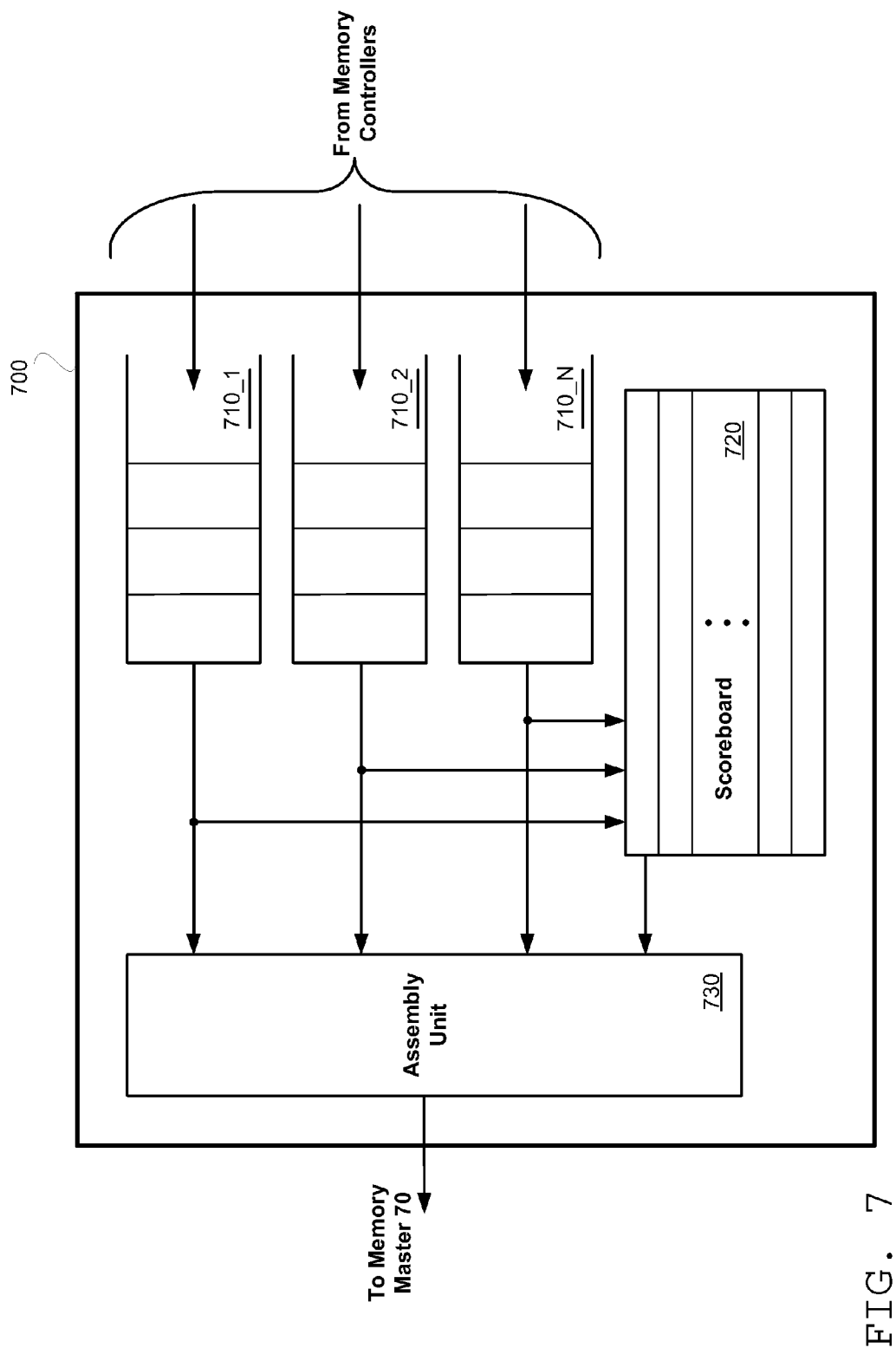
FIG. 7 is a block diagram of a push arbiter within the multi-channel distributed memory system of FIG. 4.

FIG. 7 is a block diagram of a push arbiter 700 within the multi-channel distributed memory system 400. Referring to FIG. 7, a plurality of input queues 710_1 to 710_N receive data retrieved by memory controllers 500_1 to 500_N, respectively. While the number of input queues is shown as equal to the number of memory controllers, in other embodiments a push arbiter 700 with any number of input queues may be implemented.

Aligner 730 provides data within input queues 710_1 to 710_N to memory master 70 and combines data within at least two input queues 710_1 to 710_N when directed by scoreboard 720. In an embodiment, aligner 730 comprises a plurality of transfer registers, where aligner 730 merges and aligns data by controlling the data provided to each transfer registers. Each transfer register may contain any number of data bytes, e.g., 4 bytes of data.

Scoreboard 720 may comprise a table populated with scoreboard entries, each entry to indicate when data within input queues 710_1 to 710_N is to be merged and aligned by aligner 730. After reception of retrieved data by input queues 710_1 to 710_N, scoreboard 720 determines whether a scoreboard entry has been allocated to data in input queues 710_1 to 710_N. In an embodiment, when retrieved data allocated with a scoreboard entry is provided to aligner 730, each scoreboard entry is sent to scoreboard 720, where the scoreboard 720 directs aligner 730 to merge and align retrieved data with the same scoreboard entry.

Figure 8:
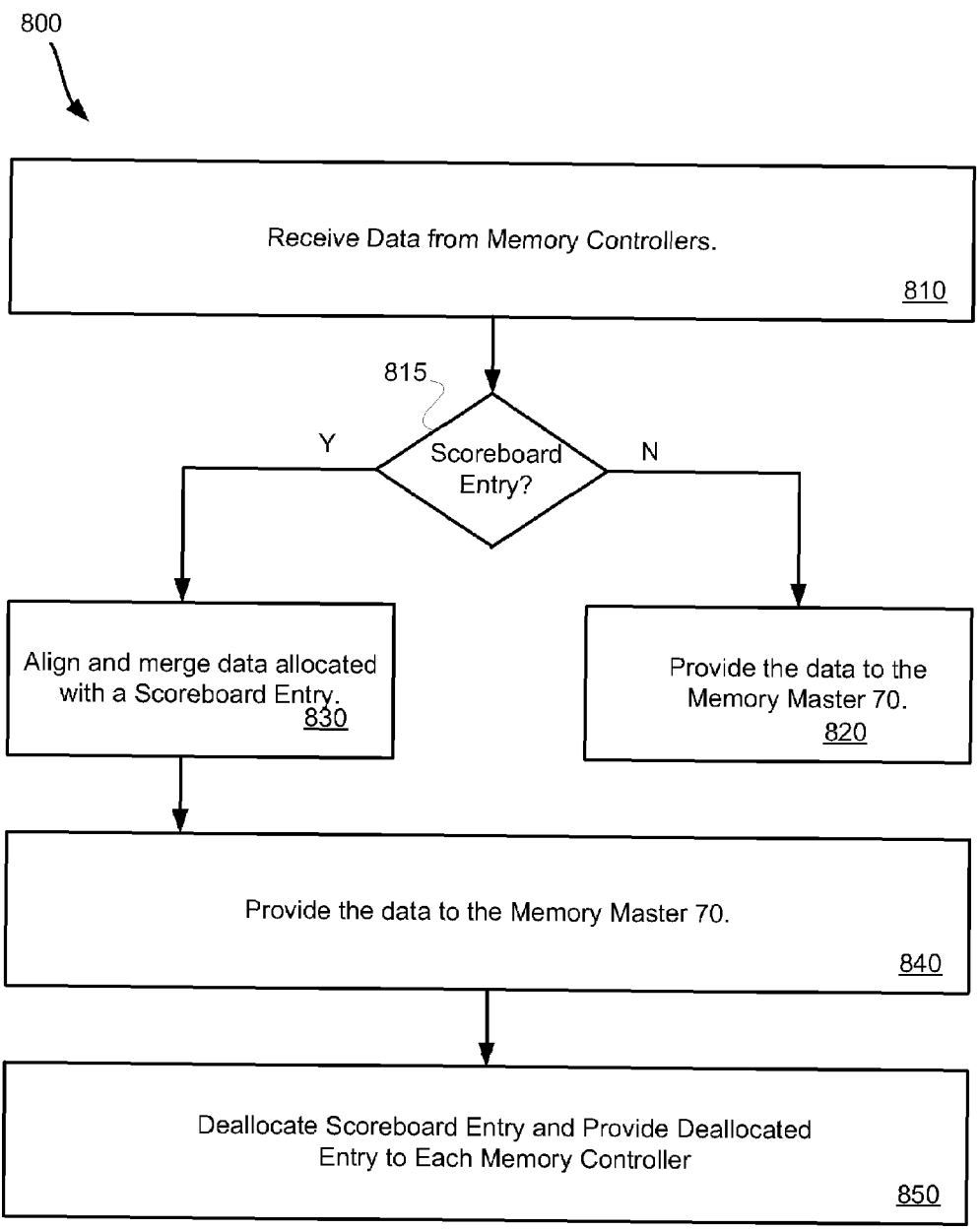
FIG. 8 is an example flow chart for operation of the push arbiter of FIG. 6.

FIG. 8 is an example flow chart 800 for operation of push arbiter 700. According to a block 810, push arbiter 700 receives data from at least two of memory controllers 500_1 to 500_N. A next decision block 815 determines whether the received data has been allocated a scoreboard entry. In an embodiment, scoreboard 720 receives each allocated scoreboard entry when input queues 710_1 to 710_N provide data allocated with the scoreboard to aligner 730.

When it is determined the received data has not been allocated a scoreboard entry, according to a next block 820, where the received data is provided to memory master 70. When, at decision block 815, it is determined the received data has been allocated a scoreboard entry, according to a next block 830, push arbiter 700 aligns and merges the data corresponding to the allocation. In an embodiment, aligner 730 merges and aligns data by controlling the data provided to each transfer registers. According to a next block 840, push arbiter 700 provides the merged and aligned data to memory master 70.

According to a next block 850, push arbiter 700 deallocates the scoreboard entry and provides the deallocated scoreboard entry to each memory controller 500_1 to 500_N. In an embodiment, the dealloacted scoreboard entry is provided to each scoreboard free-list 540 within memory controllers 500_ to 500_N. Although block 840 is shown as being performed subsequent to block 850, their order of operation may be concurrent or reversed.

One of ordinary skill in the art will recognize that the concepts taught may be tailored to a particular application in many other advantageous ways. In particular, those skilled in the art will recognize that the illustrated embodiments are but one of many alternative implementations that will become apparent upon reading this invention description. Although a transfer register implementation for push arbiter is illustrated, those skilled in the art recognize that many equivalent configurations can be employed to merge and align data from the memory controllers. Such minor modifications are encompassed within the invention, and are intended to fall within the scope of the claims.

The preceding embodiments are exemplary. Although the specification may refer to "an", "one", "another", or "some" embodiment(s) in several locations, this does not necessarily mean that each such reference is to the same embodiment(s), or that the feature only applies to a single embodiment.

The invention claimed is:

1. A memory controller comprising:
   an interleave circuit to receive a memory access command from a memory master over a bus; and
   a scoreboard free-list populated with at least one scoreboard entry to indicate data was retrieved from distributed memory responsive to the memory access command,
   wherein the interleave circuit is to cause a push arbiter, coupled between the interleave circuit and the memory master, to align the retrieved data based on a corresponding scoreboard entry.

2. The memory controller of claim 1 where the interleave circuit is operable to update the scoreboard free-list responsive to the memory access command.

3. The memory controller of claim 1 where the memory access command is a split read align command.

4. The memory controller of claim 3 where the interleave logic is operable to allocate a scoreboard entry from the scoreboard free-list responsive to the split read align command.

5. The memory controller of claim 4 where the interleave logic is operable to discard a scoreboard entry from the scoreboard free-list responsive to the split read align command.

6. The memory controller of claim 1 comprising:
an inlet queue to provide the memory access command to the distributed memory, the interleave circuit being operable to determine whether the memory access command corresponds to a first portion of the distributed memory prior to providing the memory access command to the inlet queue; and
a push queue to receive data from the first portion of the distributed memory responsive to the memory access command.

\* \* \* \* \*